US011348382B1

(12) United States Patent
Herron et al.

(10) Patent No.: US 11,348,382 B1
(45) Date of Patent: May 31, 2022

(54) SYSTEM AND METHOD FOR DETECTING REMOTE VEHICLE DIAGNOSIS

(71) Applicant: Opus IVS, Inc., Ann Arbor, MI (US)

(72) Inventors: Brian J. Herron, Dexter, MI (US);
Michael D. Jurmo, Canton, MI (US);
Mark W. Wine, Ann Arbor, MI (US);
Richard J. Green, Ann Arbor, MI (US); Timothy A. Bottomley, Dexter, MI (US); Andrew D. Betteley, Buckinghamshire (GB)

(73) Assignee: Opus IVS, Inc., Ann Arbor, MI (US)

( * ) Notice: Subject to any disclaimer, the term of this patent is extended or adjusted under 35 U.S.C. 154(b) by 232 days.

(21) Appl. No.: 16/668,389

(22) Filed: Oct. 30, 2019

(51) Int. Cl.
G07C 5/00 (2006.01)
G07C 5/08 (2006.01)
H04W 4/40 (2018.01)

(52) U.S. Cl.
CPC ........... *G07C 5/008* (2013.01); *G07C 5/0808* (2013.01); *G07C 5/0816* (2013.01); *H04W 4/40* (2018.02); *G07C 2205/02* (2013.01)

(58) Field of Classification Search
CPC .... G07C 5/008; G07C 5/0808; G07C 5/0816; G07C 2205/02; H04W 4/40
See application file for complete search history.

(56) References Cited

U.S. PATENT DOCUMENTS 6,154,658 A 11/2000 Caci
6,638,207 B2 10/2003 Cutrer et al.
6,728,603 B2 4/2004 Pruzan et al.
6,879,894 B1 4/2005 Lightner et al.
6,956,501 B2 10/2005 Kitson
7,092,803 B2 8/2006 Kapolka et al.
7,373,226 B1 5/2008 Cancilla et al.
7,502,672 B1 3/2009 Kolls
(Continued)

FOREIGN PATENT DOCUMENTS

WO 2004092857 A2 10/2004

OTHER PUBLICATIONS

Article entitled "Remote Vehicle Diagnostic System Using Mobile Handsets" by Doo-Hee Jung, Gu-Min Jeong, and Hyun-Sik Ahn, understood to be from the proceedings of the Jun. 2006 International Conference on Wireless Networks, ICWN 2006, Las Vegas, Nevada.
(Continued)

*Primary Examiner* — Michael V Kerrigan
(74) *Attorney, Agent, or Firm* — Gardner, Linn, Burkhart & Ondersma LLP

(57) ABSTRACT

A system and method of detecting remote use of a diagnostic scan tool computer device for scanning, diagnosing and/or programing a vehicle at a repair facility. A time duration for exchange of data signals between the diagnostic scan tool and an electronic system of a vehicle is tracked via a monitor application on a computer device. The tracked time is compared to a predetermined expected time threshold for the operation of exchanging data signals between the diagnostic scan tool and the electronic system of the vehicle, and an alert is provided if the tracked time exceeds the predetermined expected time threshold for the operation indicating that the diagnostic scan tool is being operated remotely from the vehicle. An electronic identifier of the diagnostic scan tool may be detected such that the number of times the diagnostic scan tool is used may be tracked and compared to an expected threshold.

19 Claims, 4 Drawing Sheets

(56) References Cited

U.S. PATENT DOCUMENTS

| | | | |
|---|---|---|---|
| 7,519,458 | B2 | 4/2009 | Buckley |
| 7,532,962 | B1 | 5/2009 | Lowrey et al. |
| 7,584,030 | B1 | 9/2009 | Graham |
| 7,786,851 | B2 | 8/2010 | Drew et al. |
| 7,840,812 | B1 | 11/2010 | Levenberg |
| 7,928,837 | B2 | 4/2011 | Drew et al. |
| 8,190,322 | B2 | 5/2012 | Lin et al. |
| 8,259,936 | B2 | 9/2012 | Mahalingaiah |
| 8,306,687 | B2 | 11/2012 | Chen |
| 8,339,254 | B2 | 12/2012 | Drew et al. |
| 8,352,577 | B2 | 1/2013 | Martone |
| 8,688,313 | B2 | 4/2014 | Margol et al. |
| 8,909,416 | B2 | 12/2014 | Chen et al. |
| 8,918,245 | B2 | 12/2014 | Dewhurst et al. |
| 9,430,884 | B2 | 8/2016 | Drew et al. |
| 9,530,255 | B2 | 12/2016 | Drew et al. |
| 9,563,988 | B2 | 2/2017 | Drew et al. |
| 9,646,130 | B2 | 5/2017 | Drew et al. |
| 10,013,816 | B2 | 7/2018 | Nassar et al. |
| 10,146,521 | B2 | 12/2018 | West et al. |
| 10,181,225 | B2 | 1/2019 | Liebl et al. |
| 10,282,924 | B2 | 5/2019 | Drew et al. |
| 10,414,277 | B1 | 9/2019 | Herron et al. |
| 10,445,953 | B1 | 10/2019 | Herron et al. |
| 10,706,645 | B1 | 7/2020 | Herron et al. |
| 10,719,813 | B1 | 7/2020 | Beckmann et al. |
| 10,748,356 | B1 | 8/2020 | Herron et al. |
| 11,062,534 | B2 | 7/2021 | Jingle et al. |
| 2001/0056544 | A1 | 12/2001 | Walker |
| 2003/0001720 | A1 | 1/2003 | Wade et al. |
| 2003/0020759 | A1 | 1/2003 | Cancilla et al. |
| 2004/0044454 | A1 | 3/2004 | Ross et al. |
| 2004/0167689 | A1 | 8/2004 | Bromley et al. |
| 2005/0021294 | A1 | 1/2005 | Trsar et al. |
| 2005/0038581 | A1 | 2/2005 | Kapolka et al. |
| 2005/0060070 | A1 | 3/2005 | Kapolka et al. |
| 2005/0182537 | A1 | 8/2005 | Tefft et al. |
| 2005/0240555 | A1 | 10/2005 | Wilde et al. |
| 2005/0251304 | A1 | 11/2005 | Cancellara et al. |
| 2006/0052921 | A1 | 3/2006 | Bodin et al. |
| 2006/0106508 | A1 | 5/2006 | Liebl et al. |
| 2006/0211446 | A1 | 9/2006 | Wittmann et al. |
| 2007/0005201 | A1 | 1/2007 | Chenn |
| 2007/0043488 | A1 | 2/2007 | Avery et al. |
| 2007/0050105 | A1 | 3/2007 | Chinnadurai et al. |
| 2007/0055420 | A1 | 3/2007 | Krzystofczyk et al. |
| 2007/0073460 | A1 | 3/2007 | Bertosa et al. |
| 2007/0185624 | A1 | 8/2007 | Duddles et al. |
| 2007/0233340 | A1 | 10/2007 | Raichle et al. |
| 2008/0177438 | A1 | 7/2008 | Chen et al. |
| 2008/0269975 | A1 | 10/2008 | Bertosa |
| 2008/0280602 | A1 | 11/2008 | Ban |
| 2008/0306645 | A1 | 12/2008 | Dewhurst et al. |
| 2009/0062978 | A1 | 3/2009 | Picard |
| 2009/0118899 | A1 | 5/2009 | Carlson |
| 2009/0119657 | A1 | 5/2009 | Link, II |
| 2009/0187976 | A1 | 7/2009 | Perroud et al. |
| 2009/0265055 | A1 | 10/2009 | Gillies |
| 2009/0276115 | A1 | 11/2009 | Chen |
| 2010/0042287 | A1 | 2/2010 | Zhang |
| 2010/0174446 | A1 | 7/2010 | Andreasen et al. |
| 2010/0204878 | A1 | 8/2010 | Drew et al. |
| 2010/0205450 | A1 | 8/2010 | Samacke et al. |
| 2010/0262335 | A1 | 10/2010 | Brozovich |
| 2011/0071709 | A1 | 3/2011 | Damiani et al. |
| 2011/0112718 | A1 | 5/2011 | Claus et al. |
| 2011/0153150 | A1 | 6/2011 | Drew et al. |
| 2011/0276218 | A1 | 11/2011 | Dwan |
| 2011/0313593 | A1 | 12/2011 | Cohen et al. |
| 2012/0046826 | A1 | 2/2012 | Panko |
| 2012/0254345 | A1 | 10/2012 | Montoya |
| 2017/0301154 | A1 | 10/2017 | Rozint |

OTHER PUBLICATIONS

Thesis entitled "Remote Connection of Diagnostic Tool" by Irina Elena Apetri and Ali Raza, Chalmers University of Technology, dated 2011.

SYSTEM AND METHOD FOR DETECTING REMOTE VEHICLE DIAGNOSIS

BACKGROUND OF THE INVENTION

The present invention is directed to vehicle diagnostic systems, and in particular to systems and methods for detecting remote vehicle diagnostic scanning and programming.

Vehicle diagnostic systems employing diagnostic scan devices or tools are used in automotive repair facilities to diagnose and repair electronic computer-based vehicle systems, where vehicles may have differing computer-based systems depending on the configuration and options installed on the vehicle. Vehicle diagnostic scan systems may include or use a diagnostic scan tool device with one or more diagnostic software programs or applications for scanning, diagnosing and/or programing vehicles, such as applications developed by an original equipment automotive manufacturer ("OEM"), or an aftermarket diagnostic company. A repair facility may utilize a local computer device, such as a diagnostic scan tool device, having such diagnostic software applications downloaded to the computer, where the applications may be updated from time-to-time. Alternatively, a repair facility may access an authorized remote diagnostic computer system that includes one or more diagnostic software applications for scanning, diagnosing and/or programing the vehicle via interaction with a local computer system at the repair facility, where the local system may include a diagnostic scan tool device. Such an authorized remote diagnostic computer system may be operated or authorized by, for example, an OEM. In operation, diagnostic software applications are used to initiate the sending of request or programming signals to and receiving of response signals from the electronic system of the vehicle, such as the electronic control units ("ECUs") of the vehicle for purposes of scanning, diagnosing and/or programming the vehicle's electronic system as needed. The scanning, diagnosing and programming processes take repeated back-and-forth signal communication between the vehicle electronic system and the hardware supporting or using the diagnostic software applications and can take an extended period of time to complete.

A repair facility may be required to obtain access to a wide range of diagnostic software applications in order to service a multitude of vehicles due to the wide range of vehicle make and models available, and varying platforms and system formats used by differing OEMs. One such manner in which repair facilities obtain access to differing diagnostic software applications is via remote diagnostic systems. In a remote diagnostic system a repair facility may access, such as via an Internet connection, a diagnostic scan tool device configured as a remote diagnostic computer device that is not operated by an OEM or authorized by the OEM for use in such manner as an intermediary remote diagnostic system, with the remote diagnostic computer device having thereon diagnostic software applications that may be used remotely for scanning, diagnosing and programing vehicles at the repair facility. Alternatively, the remote diagnostic computer device may in turn access a remote system operated or authorized by an OEM in which the authorized remote diagnostic computer system includes one or more diagnostic software applications for scanning, diagnosing and/or programing the vehicle. In this arrangement, the repair facility thus communicates with the authorized remote computer system via the remote diagnostic system, where the remote diagnostic system thus operates as an intermediary for utilization of the diagnostic software applications for scanning, diagnosing and/or programing a vehicle at the repair facility.

SUMMARY OF THE INVENTION

The present invention provides a vehicle diagnostic system and method that detects remote vehicle testing and repair, and in particular detects remote vehicle scanning, diagnosing and/or programming.

In accordance with an aspect of the present invention, a method of detecting remote use of a diagnostic scan tool computer device for scanning, diagnosing and/or programing a vehicle at a repair facility includes tracking a time duration for exchange of data signals between a diagnostic scan tool computer device and an electronic system of a vehicle to obtain a tracked time for the operation of exchanging data signals. The method further includes comparing the tracked time to a predetermined expected time threshold for the operation of exchanging data signals between the diagnostic computer device and the electronic system of the vehicle, and providing an alert if the tracked time exceeds the predetermined expected time threshold for the operation indicating that the diagnostic scan tool computer device is being operated remotely from the vehicle.

According to particular embodiments, the diagnostic scan tool is configured to selectively access an authorized diagnostic computer system that is located remotely from the diagnostic scan tool, where the authorized diagnostic computer system includes a computer device on which a monitor application is provided for the method, and includes one or more diagnostic software applications for use in scanning, diagnosing and/or programing a vehicle. The tracking of a time duration may comprise tracking a time duration of multiple exchanges of data signals to obtain a tracked time for the operation of exchanging data signals.

In the case of a diagnostic scan tool being disposed remotely from the vehicle, the diagnostic scan may selectively connect, such as via an Internet connection, with local diagnostic equipment at the repair facility, including for example a vehicle interface tool. The local diagnostic equipment may further include a local computer configured to convert signals to and from an Internet compatible transmission protocol for the exchange of data signals between the diagnostic scan tool and the electronic system of the vehicle. Likewise, a remote interface computer device may be disposed proximate to the diagnostic scan tool to convert signals to and from an Internet compatible transmission protocol for the exchange of data signals between the diagnostic scan tool computer device and the electronic system of the vehicle.

Alternatively and/or additionally, the method may further include detecting with the monitor application an electronic identifier of the diagnostic scan tool and tracking a number of service events on different vehicles conducted by the diagnostic scan tool based on the electronic identifier to obtain a tracked number of service events. The tracked number of service events may then be compared to a predetermined expected threshold of service events and an alert provided when the tracked number of service events exceeds the predetermined expected threshold of service events indicating that the diagnostic scan tool is being operated remotely from the vehicles.

In particular embodiments the electronic identifier of the diagnostic scan tool computer device is an IP address of the diagnostic scan tool. In addition, the tracking of service events on different vehicles conducted by the diagnostic scan tool may be tracked over a preset time period and compared to an expected threshold of service events is based on the same time period.

The vehicle diagnostic system and method of the present invention enables the detection of whether a remote diagnostic system is being used to scan, diagnose and program vehicles. This is beneficial to an OEM or authorized diagnostic software application suppler in instances in which a diagnostic scan tool device is being used in such a manner without authorization, such as to circumvent licensing agreements or intended uses of such equipment. Including, for example, agreements that require the diagnostic scan tool device to be used in a repair facility local to the vehicles on which the system is being used. These and other objects, advantages, purposes and features of this invention will become apparent upon review of the following specification in conjunction with the drawings.

DESCRIPTION OF THE PREFERRED EMBODIMENTS

The present invention will now be described with reference to the accompanying figures, wherein the numbered elements in the following written description correspond to like-numbered elements in the figures.

Figure 1:
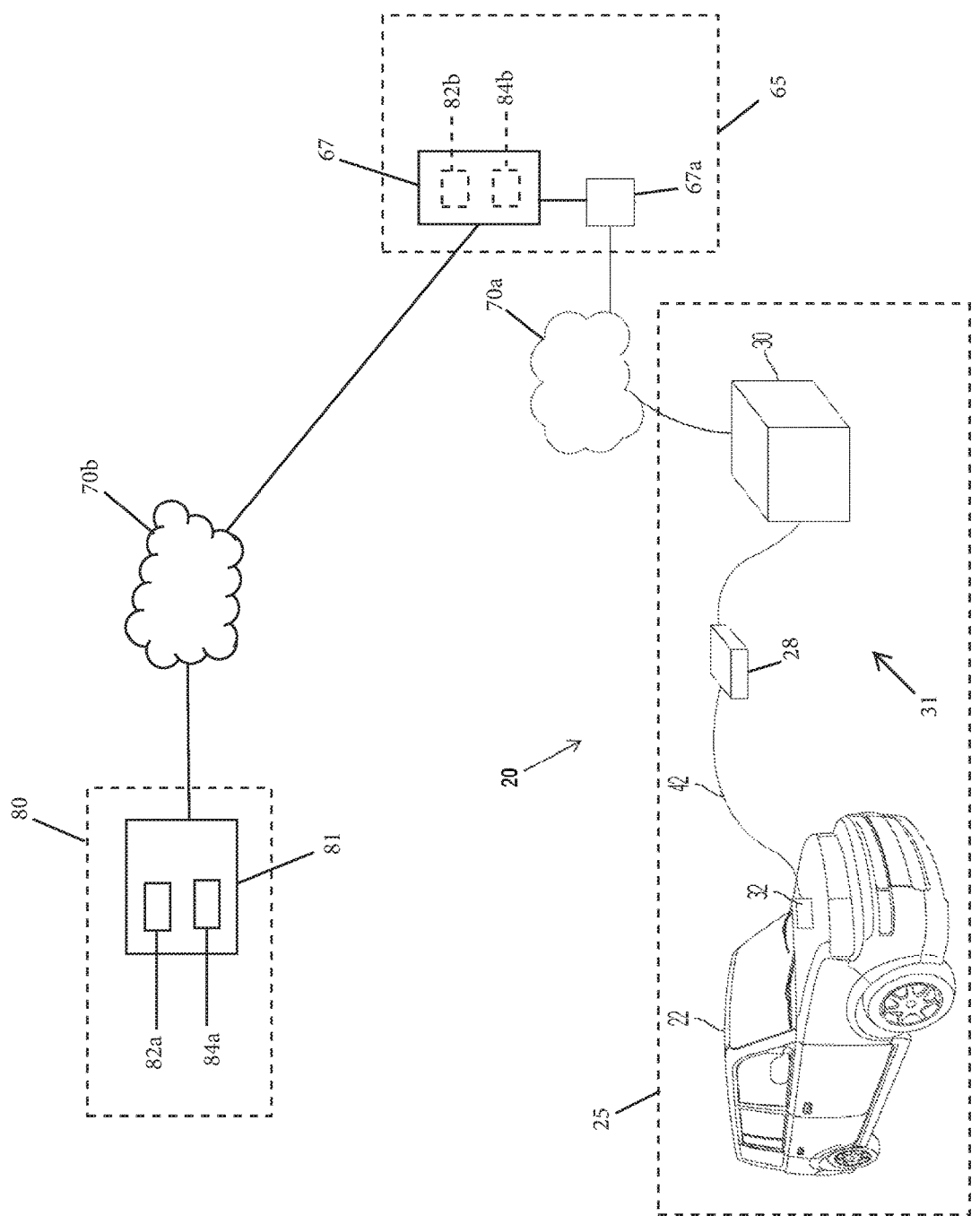
FIG. 1 is a schematic illustration of a vehicle diagnostic arrangement in accordance with the present invention in which a remote diagnostic system is shown in use with a vehicle.
Figure 2:
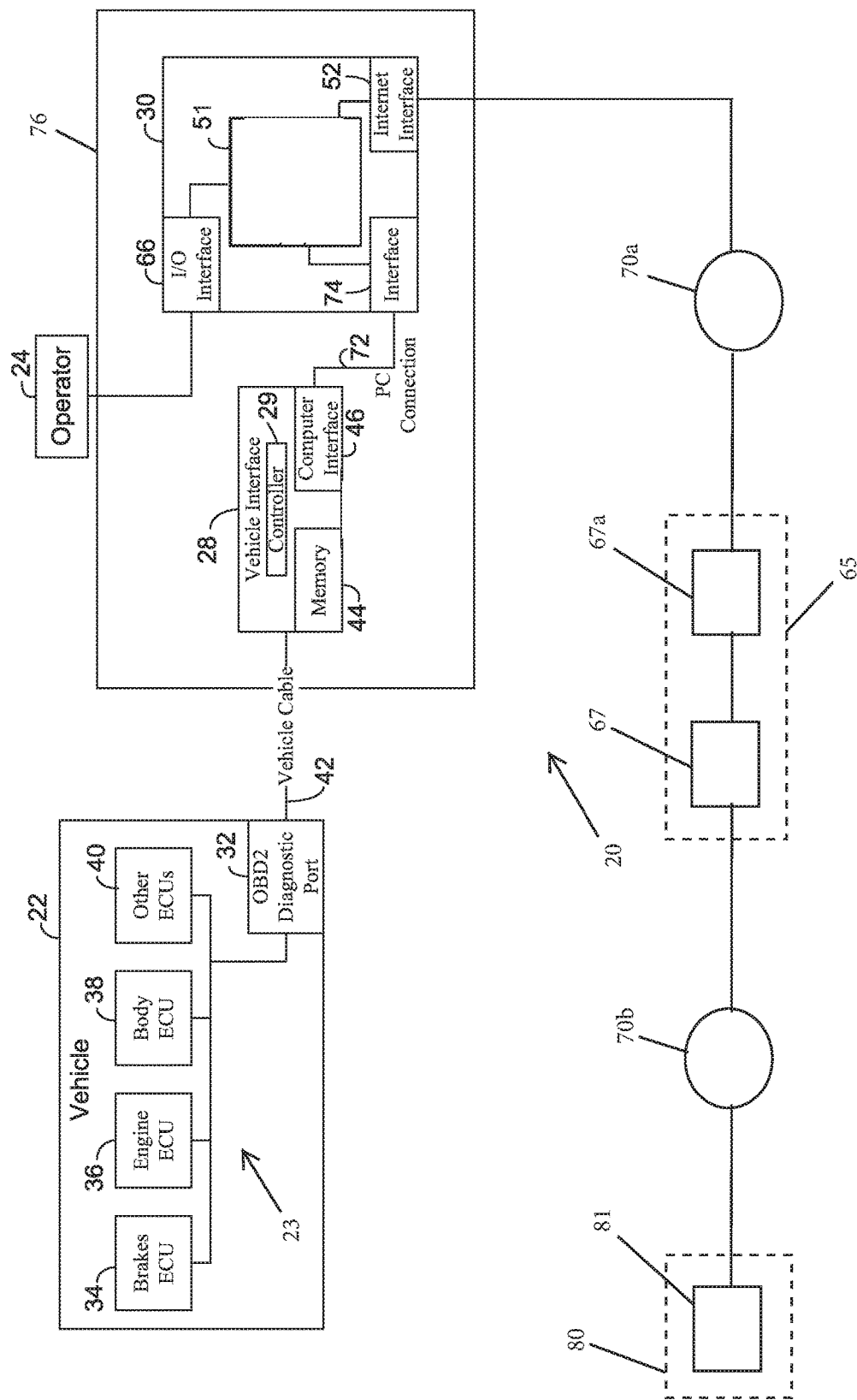
FIG. 2 is a detailed block diagram of the vehicle diagnostic arrangement of FIG. 1.

With reference to FIGS. 1 and 2, a vehicle diagnostic system or arrangement 20 for use with a vehicle 22 is shown for use by a mechanic or operator 24, such as in an automotive repair facility 25. As shown, a vehicle interface device or interface tool 28, is communicatively coupled to a local computer 30, such as a laptop computer or a custom computer device, where the interface tool 28 and local computer 30 comprise the local diagnostic equipment 31 in the illustrated embodiment. In use, vehicle interface tool 28 is connected with vehicle 22 by operator 24, such as by connecting to an on-board diagnostic ("OBD") diagnostic port 32 of the vehicle 22 in order to diagnose the vehicle electronic system 23 of vehicle 22, including to diagnose various vehicle electronic control units (ECUs), such as an engine ECU 34, body ECU 36, brakes ECU 38, and/or other ECUs 40, and/or other electronic parts and components of vehicle 22. Vehicle interface tool 28 connects with port 32, such as via vehicle cable 42. Vehicle interface tool 28 includes a controller 29, such as in the form of a processor or micro-processor and interface circuitry to facilitate communication between the ECUs and the vehicle interface tool 28, with interface tool 28 including a database of vehicle protocols found in a local memory 44 that allow communication with the ECUs of various makes and models of vehicles. Vehicle interface tool 28 additionally includes a computer interface 46 for connection with local computer 30, such as via a standard interface 74, such as by way of a USB, Bluetooth, Wi-Fi, or the like connection 72.

As also understood from FIGS. 1 and 2, the local diagnostic equipment 31, such as via the local computer 30, is configured to be connected to a remote diagnostic system 65, such as by an Internet connection 70a, where in the illustrated embodiment remote diagnostic system 65 includes a diagnostic scan tool device 67 that is configured to operate as a remote diagnostic computer device, where the scan tool device 67 may be configured as a tablet, laptop computer, desktop computer, custom computer device, or the like, such as supplied by an OEM or authorized for use by an OEM or by a source of diagnostic applications. In operation, operator 24 may establish the connection between the local diagnostic equipment 31 and the remote diagnostic system 65, such as by way of an interface 66 on local computer 30 that may include a touch screen or keyboard. In particular, local computer 30 includes one or more protocol conversion applications 51 for converting data information received from interface tool 28 to an internet transmittable protocol for transmission to remote diagnostic system 65, as well as for converting an internet transmittable protocol signal received from remote diagnostic system 65 to a protocol for transmission to vehicle interface tool 28, and then to the vehicle electronic system 23 of vehicle 22. For example, in the case of remote data transmissions via Internet connections such as shown in the illustrated embodiment, the transmission of signals over the Internet may include conversion from a vehicle interface tool 28 protocol to and from TCP/IP ("transmission control protocol/Internet protocol") or UDP ("user datagram protocol").

Likewise, in addition to diagnostic scan tool device 67, remote diagnostic system 65 also includes one or more hardware devices and/or software applications for enabling Internet communication with local diagnostic equipment 31, such as via a remote interface computer device 67a configured to convert between different communication protocols. This includes for example with respect to the illustrated embodiment, converting received TCP/IP or UDP protocol signals from local computer 30 to a protocol for use by the diagnostic scan tool device 67, as well as converting signals from the diagnostic scan tool device 67 to a protocol for transmission of signals over the Internet connection 70a. In the illustrated embodiment remote interface computer device 67a is located proximate to scan tool device 67 and is operably connected with scan tool device 67, such as via a USB, Ethernet or WiFi connection, LAN network, or the like As understood from FIG. 2, local computer 30 includes an interface 52 for enabling communication between local computer 30 and remote diagnostic system 65 via Internet connection 70a.

Remote diagnostic system 65 may be configured to remotely scan, diagnose and program vehicle electronic systems 23 either by way of diagnostic scan tool device 67 further interfacing with an authorized remote diagnostic computer system 80 that supports the diagnostic applications, or by having diagnostic applications downloaded directly on the diagnostic scan tool device 67.

In the case of the remote diagnostic system 65 interfacing with an authorized remote diagnostic computer system 80, such as may be operated or authorized by an OEM, the communication occurs as shown in the illustrated embodiment over another Internet connection 70b. Authorized remote diagnostic computer system 80 includes one or more computer devices, such as a server or other computer device comprising an authorized remote diagnostic computer 81, supporting one or more diagnostic software applications. In the illustrated embodiment authorized remote diagnostic computer system 80 is shown to include one or more diagnostic software applications 82a, where each diagnostic software application 82a may be used, for example, with different models of vehicles and/or vehicles having different options.

It should be appreciated that repair facility 25, remote diagnostic system 65 and authorized remote diagnostic computer system 80 are in physically separate locations from each other, where they may be separated by great distances, such as each being separated by many miles or even in separate states, with communication occurring there between, for example, via electronic information exchange, such as via the Internet. Accordingly, in accordance with the present invention and in order for the operator of authorized remote diagnostic computer system 80 to detect and determine whether the computer system 80 is communicating with a vehicle 22 via a diagnostic scan tool located directly at repair facility 25 or is communicating with a vehicle 22 through or with an intermediary remote diagnostic system 65, authorized remote diagnostic computer system 80 additionally includes functionality to systematically check the scanning, diagnosing and/or programming processes to enable such detection. This is because the diagnostic scan tool may not be authorized for use to as a remote diagnostic scan tool, such as shown at 67 in FIGS. 1 and 2. That is, to be used either remotely from a vehicle repair facility 25 and/or to access diagnostic software applications 82a from a location that is remote from the vehicle repair facility 25. In the illustrated embodiment, therefore, authorized remote diagnostic computer system 80 includes one or more software monitor applications 84a that integrally operate with the diagnostic software applications 82a for detecting and determining if authorized remote diagnostic computer system 80 is communicating directly with a vehicle 22 at a repair facility 25, such as via an OEM scan tool and vehicle interface tool 28 located at the repair facility, or is communicating with the vehicle 22 at a repair facility via an intermediary remote diagnostic system 65.

Monitor application 84a may include one or more operations for detecting if diagnostic software applications 82a are interfacing with an intermediary remote diagnostic system 65. For example, in one embodiment monitor application 84a performs detection on a time basis, where monitor application 84a tracks the time durations for one or more information data requests and response exchanges and performance of operations based on the signal exchanges between the vehicle electronic system 23 of vehicle 22 and a diagnostic scan tool such as remote diagnostic scan tool device 67, such as controlled via diagnostic software applications 82a at authorized computer system 80. For example, remote diagnostic scan tool device 67 may be configured as an OEM scan tool that interfaces with OEM diagnostic software application 82a for scanning and reprogramming of one or more ECUs of vehicle 22. In operation, signals are thus exchanged between the diagnostic scan tool device 67 and the vehicle electronic system 23 via the vehicle interface tool 28. Vehicle interface tool 28 converts signals to and from the particular protocol of the vehicle electronic system 23 of the vehicle 22 and the transmission of signals over the Internet may include additional conversion from the vehicle interface tool 28 protocol to and from an Internet compatible transmission format, such as TCP/IP protocol or UDP protocol, such as noted above by and between the local computer 30 and the remote interface computer device 67a.

Accordingly, monitor application 84a is configured to track the time between exchanges of information signals, such as to and from the remote diagnostic scan device 67, as controlled by authorized computer system 80, and the local diagnostic equipment 31 and vehicle 22, which in turn will involve communication over Internet connection 70a. That is, there will be an expected, normal or standard time duration between request signals and response signals when a diagnostic scan tool is being used with a vehicle interface tool 28 within a repair facility proximate a vehicle for scanning, diagnosing and/or programming such a vehicle that is at the repair facility. This includes, for example, a request signal initiated by the authorized remote diagnostic computer system 80 running a diagnostic software application 82a through such a diagnostic scan tool located within a repair facility and connected to a vehicle through a vehicle interface tool 28, and a response signal from the vehicle through the interface device to the diagnostic scan tool located at the repair facility adjacent the vehicle.

In contrast, when an intermediary remote diagnostic system 65 is being used to remotely interface with a vehicle 22 via an internet connection 70a, additional time will occur from when a request signal is initiated via the authorized diagnostic computer system 80 running a diagnostic software application 82a controlling the remote diagnostic scan device 67 and a response is returned from the vehicle 22, such as to the remote diagnostic scan device 67 or to the authorized diagnostic computer system 80. This additional time is a result of the use of the remote diagnostic system 65 and the additional internet bridge established there between with the vehicle 22. This includes, for example, additional time resulting from the conversion of signals to and from Internet compatible protocols, such as for the transmission of signals from the remote diagnostic system 65 to the local diagnostic equipment 31 and vice versa.

Accordingly, authorized remote diagnostic computer system 80 and/or monitor application 84a includes values for expected time durations for exchanges of data signals between a vehicle electronic system 23 and a diagnostic scan tool used at a repair facility with a vehicle interface tool 28. The values may include data for discrete signal exchange operations and/or a series of aggregated signal exchanges, as well as for numerous different makes, models and scanning, diagnosing and/or programming operations. Upon detection of a signal exchange that exceeds a predetermined expected time duration, monitor application 84a is able to raise an alert, such as on authorized remote diagnostic computer system 80 whereby the operator or OEM determines that the data exchange with the diagnostic scan device 67 is an intermediary remote diagnostic system 65 that is being operated remotely from a vehicle 22 at a repair facility 25 and does not represent a diagnostic scan device disposed directly at the repair facility 25. The operator may then determine based on a computer identification of the remote diagnostic computer device 67 whether it is being operated in accordance with a license agreement, stop operation to the remote diagnostic computer device 67 and/or assess penalties to the owner or operator of the remote diagnostic computer device 67.

Figure 3A:
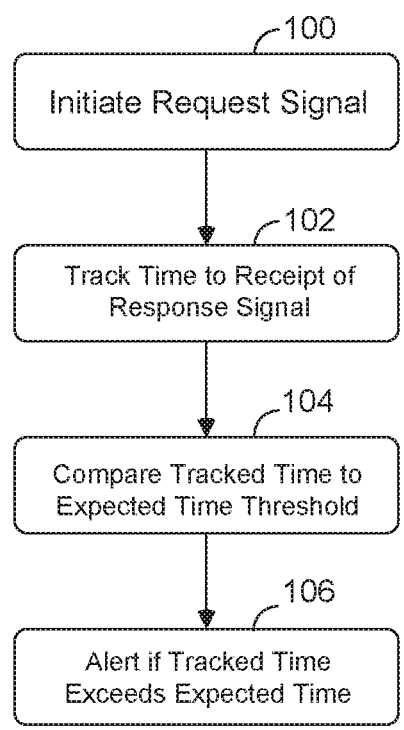
FIG. 3A is a flow diagram of a method in accordance with an aspect of the present invention for determining if a diagnostic software application is being used with a remote diagnostic system.

An exemplary embodiment of the use and operation of monitor application 84a on a time detection basis is illustrated in FIG. 3A. As there shown, at step 100 a request signal is initiated, such as a request sent from a diagnostic scan tool device to a vehicle electrical system under the control of a diagnostic software application. Monitor application 84a then tracks the time at step 102 of when receipt is obtained of a response signal, such as the response signal from the vehicle electrical system through an interface device to the diagnostic scan tool device. At step 104, the tracked time is compared to an expected time threshold for the given request and response signal operation. As illustrated at step 106, an alert is raised if the tracked time exceeds the threshold time, thus indicating that the diagnostic scan tool device is being used as a remote scan tool device, such as in a remote diagnostic system 65.

Alternatively and/or additionally to operation of monitor application 84*a* on a time detection basis, monitor application 84*a* may also detect an electronic identifier of a remote diagnostic scan device 67 and track a frequency of use of the remote diagnostic scan device 67 for detecting if diagnostic software applications 82*a* are interfacing with an intermediary remote diagnostic system 65. For example, monitor application 84*a* may track Internet Protocol ("IP") addresses for computer devices accessing the authorized remote diagnostic computer 81, which would include tracking access by intermediary remote diagnostic computer devices 67. In addition to tracking the IP address identifier, monitor application 84*a* additionally tracks the frequency of such a remote diagnostic computer devices 67 accessing the diagnostic software applications 82*a*. It should be appreciated, for example, that there will be a range of normal service procedures on vehicles at a given repair facility 25 for which diagnostic software applications 82*a* are accessed for scanning, diagnosing and/or programming of the vehicles. In contrast, a remote diagnostic system 65 may be used by an operator to service numerous repair facilities and thus be used with a high number of vehicles beyond what would otherwise be expected, for example over a given time period such as a day, week or month. Accordingly, normal usage access thresholds may be set by the operator of the authorized remote diagnostic computer system 80, whereby an alert may be provided upon when the accessing from a given IP address exceeds that access threshold by a remote diagnostic computer device 67 whereby the operator or OEM determines that the data exchange with the remote diagnostic computer device 67 is an intermediary remote diagnostic system 65 that is being operated remotely from a vehicle 22 at a repair facility 25 and does not represent a diagnostic scan tool disposed directly at the repair facility 25. The operator may then stop operation to the remote diagnostic computer device 67 and/or assess penalties to the owner or operator of the remote diagnostic computer device 67.

Figure 3B:
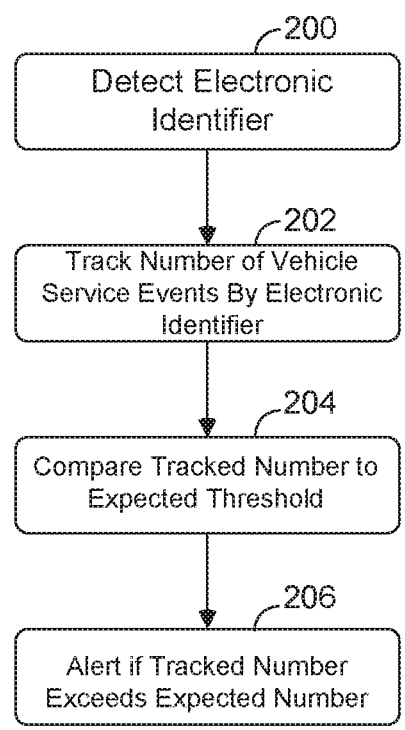
FIG. 3B is a flow diagram of an alternative method in accordance with an aspect of the present invention for determining if a diagnostic software application is being used with a remote diagnostic system.

An exemplary embodiment of the use and operation of monitor application 84*a* on an electronic identifier and frequency basis is illustrated in FIG. 3B. As there shown, at step 200 an electronic identifier for a diagnostic scan tool is detected. Monitor application 84*a* then tracks the number of vehicle service events at step 202, such as vehicle scans and vehicle programming operations that are performed by the device associated with the electronic identifier. At step 204, a comparison is made of the tracked number of vehicle service events to an expected threshold for the number of vehicle service events that would be expected under normal, standard use at a repair facility. As illustrated at step 206, an alert is raised if the tracked number of vehicle service events exceeds the expected threshold of events, thus indicating that the diagnostic scan tool device is being used as a remote scan tool device, such as in a remote diagnostic system 65. It should be appreciated that the vehicle service events refer to service events on separate vehicles, including scanning, diagnosing and/or programming in which data exchanges are made with the electronic system of each vehicle. This may be determined, for example, based on detection of a vehicle identification number ("VIN") for each vehicle.

It should be appreciated that alternative electronic identifiers may be employed including, for example, a subnet mask number, a website IP address, or the like. Still further, a general or specific physical location may be determined based on such an electronic identifier, with the physical location being used to assess whether the data exchange with the remote diagnostic computer device 67 is an intermediary remote diagnostic system 65 that is being operated remotely from a vehicle 22 at a repair facility 25 and does not represent a diagnostic scan tool disposed directly at the repair facility 25.

Monitor application 84*a* may be computer code integrated with a diagnostic software applications 82*a*, or may be computer code that is separate from and runs in parallel with the diagnostic software application 82*a*, or may be computer code through which the diagnostic software application 82*a* is run, where monitor application 84*a* may comprise one or more programs that cooperatively operate together. Still further monitor application 84*a* may be integrated with separate hardware equipment from that supporting diagnostic software application 82*a*.

As noted above, a diagnostic scan tool device 67 may alternatively and/or additionally include diagnostic applications thereon, such as one or more diagnostic applications 82*b* as shown in FIG. 1, whereby device 67 need not access the authorized remote diagnostic computer system 80 in order to scan, diagnose or program a vehicle. In this case, a scan tool device 67 to which the diagnostic applications are downloaded may also be provided with a monitor application 84*b* that is integrated to operate with the diagnostic applications 82*b* thereon. It should be appreciated that the scan tool device 67 will need to be updated from time-to-time, such as to update or add new diagnostic applications 82*b*, where the update would occur by remotely connecting the scan tool device 67 to a remote computer, such as an authorized remote diagnostic computer 81 operated by the OEM or authorized supplier of the diagnostic applications 82*b*. In this case the monitor application 84*b* is configured to record operational information for determining if the scan tool device 67 is being used in a remote diagnostic system 65 and will provide that information to authorized remote diagnostic computer 81 during an update procedure.

For example, monitor application 84*b* may track and record time data for operations as discussed above with regard to monitor application 84*a*, including data for discrete signal exchange operations and/or a series of aggregated signal exchanges between the vehicle electronic system 23 and the scan tool device 67 for scanning, diagnosing and/or programming operations undertaken using the scan tool device 67. The authorized remote diagnostic computer 81 may then evaluate these operations once they have been downloaded to determine if one or more of the signal exchanges exceed a predetermined expected time duration, whereby the operator or OEM determines that the scan tool device 67 is being used as an intermediary remote diagnostic system 65 that is being operated remotely from a vehicle 22 at a repair facility 25 and does not represent a diagnostic scan tool disposed directly at the repair facility 25.

It should be appreciated that vehicle diagnostic arrangement 20 may be configured to be selectively operable in one of a plurality of different modes, whereby a technician may use the vehicle interface tool 28 for vehicle maintenance, diagnosis, programming and repair as needed. Moreover, in the illustrated embodiment vehicle interface tool 28 and local computer 30 are shown as separate components making up a local computer system 31, that is with local computer 30 being proximate at the repair facility 25 such that it is proximate the vehicle 22. In an alternative arrangement, vehicle interface tool 28 and local computer 30 may be integrated in a single computer device 76 (FIG. 2), which would likewise be proximate the vehicle at the repair facility. Likewise, although scan tool device 67 and remote interface computer device 67a are illustrated as separate components, in an alternative arrangement they may be integrated together in a hardware system comprising various controllers and software modules.

Changes and modifications in the specifically described embodiments can be carried out without departing from the principles of the present invention which is intended to be limited only by the scope of the appended claims, as interpreted according to the principles of patent law including the doctrine of equivalents.

The embodiments of the invention in which an exclusive property or privilege is claimed are defined as follows:

1. A method of detecting remote use of a diagnostic scan tool computer device for scanning, diagnosing and/or programing a vehicle at a repair facility, wherein said method comprises:
   tracking a time duration for exchange of data signals between a diagnostic scan tool computer device and an electronic system of a vehicle to obtain a tracked time for operation of exchanging data signals between the diagnostic scan tool computer device and the electronic system of the vehicle, wherein said tracking the time duration is performed via a monitor application on a monitoring computer device;
   comparing the tracked time to a predetermined expected time threshold for the operation of exchanging data signals between the diagnostic computer device and the electronic system of the vehicle; and
   providing an alert when the tracked time exceeds the predetermined expected time threshold for the operation indicating that the diagnostic scan tool computer device is being operated remotely from the vehicle.

2. The method of claim 1, wherein the diagnostic scan tool computer device is configured to selectively access an authorized diagnostic computer system that is located remotely from the diagnostic scan tool computer device, and wherein the authorized diagnostic computer system includes the monitoring computer device of the monitor application and includes one or more diagnostic software applications for use in scanning, diagnosing and/or programing a vehicle.

3. The method of claim 2, wherein said tracking the time duration for exchange of data signals between the diagnostic scan tool computer device and the electronic system of the vehicle comprises tracking a time duration of multiple exchanges of data signals to obtain the tracked time for the operation of exchanging data signals.

4. The method of claim 2, wherein the diagnostic scan tool computer device is configured to selectively access the authorized diagnostic computer system via an Internet connection.

5. The method of claim 1, wherein the diagnostic scan tool computer device is located remotely from the repair facility and selectively connects with local diagnostic equipment at the repair facility.

6. The method of claim 5, wherein the diagnostic scan tool computer device selectively connects with the local diagnostic equipment via an Internet connection.

7. The method of claim 5, wherein the local diagnostic equipment comprises a vehicle interface tool.

8. The method of claim 7, wherein the local diagnostic equipment further comprises a local computer, and wherein said local computer is configured to convert signals to and from an Internet compatible transmission protocol for the exchange of data signals between the diagnostic scan tool computer device and the electronic system of the vehicle.

9. The method of claim 5, further including a remote interface computer device disposed proximate to the diagnostic scan tool computer device, and wherein the remote interface computer device is configured to convert signals to and from an Internet compatible transmission protocol for the exchange of data signals between the diagnostic scan tool computer device and the electronic system of the vehicle.

10. The method of claim 1, wherein the diagnostic scan tool computer device is the computer device on which the monitor application is disposed.

11. The method of claim 1, wherein said method further comprises:
   detecting with the monitor application an electronic identifier of the diagnostic scan tool computer device;
   tracking a number of service events on different vehicles conducted by the diagnostic scan tool computer device based on the electronic identifier to obtain a tracked number of service events;
   comparing the tracked number of service events to a predetermined expected threshold number of service events; and
   providing an alert when the tracked number of service events exceeds the predetermined expected threshold number of service events indicating that the diagnostic scan tool computer device is being operated remotely from the vehicles.

12. The method of claim 11, wherein the electronic identifier of the diagnostic scan tool computer device comprises an IP address of the diagnostic scan tool computer device.

13. The method of claim 11, wherein said tracking a number of service events on different vehicles conducted by the diagnostic scan tool computer device comprises tracking a number of service events over a preset time period, and wherein the predetermined expected threshold number of service events is based on a same time period as the preset time period.

14. A method of detecting remote use of a diagnostic scan tool computer device for scanning, diagnosing and/or programing a vehicle at a repair facility, wherein said method comprises:
   detecting with a monitor application on an authorized diagnostic computer system an electronic identifier of the diagnostic scan tool computer device, wherein the authorized diagnostic computer system is located remotely from the diagnostic scan tool computer device;
   tracking a number of service events on different vehicles conducted by the diagnostic scan tool computer device based on the electronic identifier to obtain a tracked number of service events;
   comparing the tracked number of service events to a predetermined expected threshold number of service events; and
   providing an alert when the tracked number of service events exceeds the predetermined expected threshold number of service events indicating that the diagnostic scan tool computer device is being operated remotely from the vehicles.

15. The method of claim 14, further comprising:
   tracking a time duration for exchange of data signals between the diagnostic scan tool computer device and an electronic system of a vehicle to obtain a tracked time for the operation of exchanging data signals between the diagnostic scan tool computer device and the electronic system of the vehicle, wherein said tracking a time duration is performed via the monitor application;

comparing the tracked time to a predetermined expected time threshold for the operation of exchanging data signals between the diagnostic computer device and the electronic system of the vehicle; and providing an alert when the tracked time exceeds the predetermined expected time threshold for the operation indicating that the diagnostic scan tool computer device is being operated remotely from the vehicle.

16. A method of detecting remote use of a diagnostic scan tool computer device for scanning, diagnosing and/or programing a vehicle at a repair facility, wherein said method comprises:

tracking a time duration for exchange of data signals between a diagnostic scan tool computer device and an electronic system of a vehicle to obtain a tracked time for the operation of exchanging data signals between the diagnostic scan tool computer device and the electronic system of the vehicle, wherein said tracking the time duration is performed via a monitor application on a computer device;

comparing the tracked time to a predetermined expected time threshold for the operation of exchanging data signals between the diagnostic computer device and the electronic system of the vehicle; and providing an alert when the tracked time exceeds the predetermined expected time threshold for the operation indicating that the diagnostic scan tool computer device is being operated remotely from the vehicle;

wherein the diagnostic scan tool computer device is configured to selectively access an authorized diagnostic computer system that is located remotely from the diagnostic scan tool computer device via an Internet connection, and wherein the authorized diagnostic computer system includes the computer device of the monitor application and includes one or more diagnostic software applications for use in scanning, diagnosing and/or programming a vehicle, and wherein the diagnostic scan tool computer device is located remotely from the repair facility and selectively connects with local diagnostic equipment at the repair facility via an Internet connection, and wherein the local diagnostic equipment comprises a vehicle interface tool.

17. The method of claim 16, wherein said tracking the time duration for exchange of data signals between the diagnostic scan tool computer device and the electronic system of the vehicle comprises tracking the time duration of multiple exchanges of data signals to obtain a tracked time for the operation of exchanging data signals.

18. The method of claim 16, wherein the local diagnostic equipment further comprises a local computer, and wherein said local computer is configured to convert signals to and from an Internet compatible transmission protocol for the exchange of data signals between the diagnostic scan tool computer device and the electronic system of the vehicle.

19. The method of claim 18, further including a remote interface computer device disposed proximate to the diagnostic scan tool computer device, and wherein the remote interface computer device is configured to convert signals to and from the Internet compatible transmission protocol for the exchange of data signals between the diagnostic scan tool computer device and the electronic system of the vehicle.

* * * * *